US008270284B2

(12) United States Patent
Takeshita et al.

(10) Patent No.: US 8,270,284 B2
(45) Date of Patent: Sep. 18, 2012

(54) OPTICAL DISK AND OPTICAL DISK DEVICE AND CONTROL DEVICE

(75) Inventors: Nobuo Takeshita, Tokyo (JP); Noboru Yashima, Tokyo (JP); Masaharu Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 342 days.

(21) Appl. No.: 11/885,145

(22) PCT Filed: Feb. 21, 2006

(86) PCT No.: PCT/JP2006/303029
§ 371 (c)(1),
(2), (4) Date: Aug. 27, 2007

(87) PCT Pub. No.: WO2006/098118
PCT Pub. Date: Sep. 21, 2006

(65) Prior Publication Data
US 2008/0159086 A1    Jul. 3, 2008

(30) Foreign Application Priority Data

Mar. 15, 2005   (JP) .................................. 2005-072359

(51) Int. Cl.
*G11B 7/24*    (2006.01)
(52) U.S. Cl. .................................. 369/275.1; 369/275.4
(58) Field of Classification Search .............. 369/30.1, 369/275.1, 275.4, 275.3, 275.2, 283, 281, 369/284, 286; 428/64.1, 64.4; 430/321, 430/320, 270.1, 270.11, 270.13
See application file for complete search history.

(56) References Cited

U.S. PATENT DOCUMENTS

| 5,596,564 | A | * | 1/1997 | Fukushima et al. | 386/246 |
| 5,883,878 | A | * | 3/1999 | Satoh et al. | 369/275.1 |
| 5,898,708 | A | * | 4/1999 | Tateishi et al. | 714/752 |
| 6,381,208 | B1 | * | 4/2002 | Abe et al. | 369/112.01 |
| 2004/0264339 | A1 | * | 12/2004 | Miyagawa et al. | 369/94 |
| 2009/0086604 | A1 | * | 4/2009 | Usami | 369/103 |
| 2009/0103415 | A1 | * | 4/2009 | Usami | 369/103 |
| 2009/0245066 | A1 | * | 10/2009 | Katsuura et al. | 369/100 |
| 2009/0310473 | A1 | * | 12/2009 | Katsuura et al. | 369/275.4 |

(Continued)

FOREIGN PATENT DOCUMENTS

JP    11-232700 A    8/1999

(Continued)

OTHER PUBLICATIONS

Shin Kawakubo, The Journal of the Institute of Electrical Engineers of Japan, Feb. 1, 2005, pp. 79-83.

(Continued)

*Primary Examiner* — Tan X Dinh
(74) *Attorney, Agent, or Firm* — Birch, Stewart, Kolasch & Birch, LLP (57) ABSTRACT

The present invention relates to optical disks and optical disk devices, and has an object to reduce access time and prevent malfunction. To attain the above object, in an optical disk (100), a management information area (130) is placed inside a user data area (140), namely, at the innermost circumference position of the optical disk (100), in an information layer (101) placed at the farthest position from the surface. A position information area (132) that stores position information indicating the position of each information layer in a thickness direction of the optical disk (100) is placed in the management information area (130).

6 Claims, 11 Drawing Sheets

U.S. PATENT DOCUMENTS

2010/0061210 A1 * 3/2010 Kim et al. .................. 369/94

FOREIGN PATENT DOCUMENTS

| | | | |
|---|---|---|---|
| JP | 2000-315323 | A | 11/2000 |
| JP | 2003-109219 | A | 4/2003 |
| JP | 2003-346379 | A | 12/2003 |
| TW | 2004425106 | | 11/2004 |

OTHER PUBLICATIONS

Japanese Office Action mailed on Aug. 4, 2009 for corresponding Japanese Application No. 2005-072359.

* cited by examiner

OPTICAL DISK AND OPTICAL DISK DEVICE AND CONTROL DEVICE

TECHNICAL FIELD

The present invention relates to optical disks, optical disk devices and control devices, and more specifically to techniques of recording or reproducing information on or from an optical disk that includes a plurality of information layers.

BACKGROUND ART

In conventional optical disks including a plurality of information layers, the positions in a thickness direction of the respective information layers are set in a way that allows optimum recording or reproduction with respect to the respective information layers (see a patent document 1, for example).

Patent Document 1: Japanese Patent Application Laid-Open NO. 2000-311346

However, the positions in a thickness direction of the respective information layers can be set arbitrarily in such optical disks as described above, and thus vary depending on the type of an optical disk. This increases the time necessary for detecting the positions of the respective information layers when accessing the layers by an optical disk device, resulting in longer access time.

Further, in an optical disk device that makes access by a converging spot, access is tried to information layers that cannot be accessed due to the positions thereof, which may cause a malfunction to occur.

DISCLOSURE OF INVENTION

The present invention has been made to solve the aforementioned problems, and has an object to provide an optical disk, an optical disk device and a control device capable of reducing access time and preventing malfunction.

In a first aspect of the invention, an optical disk (100) includes a group of information layers including a plurality of information layers (101 to 108), and optically records or reproduces information on or from each of the information layers (101 to 108), wherein position information indicating positions of the respective information layers (102 to 108) in a thickness direction of the optical disk (100) is recorded on the group of information layers.

According to the first aspect of the optical disk of the present invention, the time necessary for detecting the positions of the respective information layers (102 to 108) is reduced when accessing the layers by the optical disk device (200), thereby reducing access time.

In addition, the prior detection of inaccessible information layers prevents a malfunction that occurs when access is tried to an inaccessible information layer.

BEST MODES FOR CARRYING OUT THE INVENTION

First Preferred Embodiment

Figure 1:
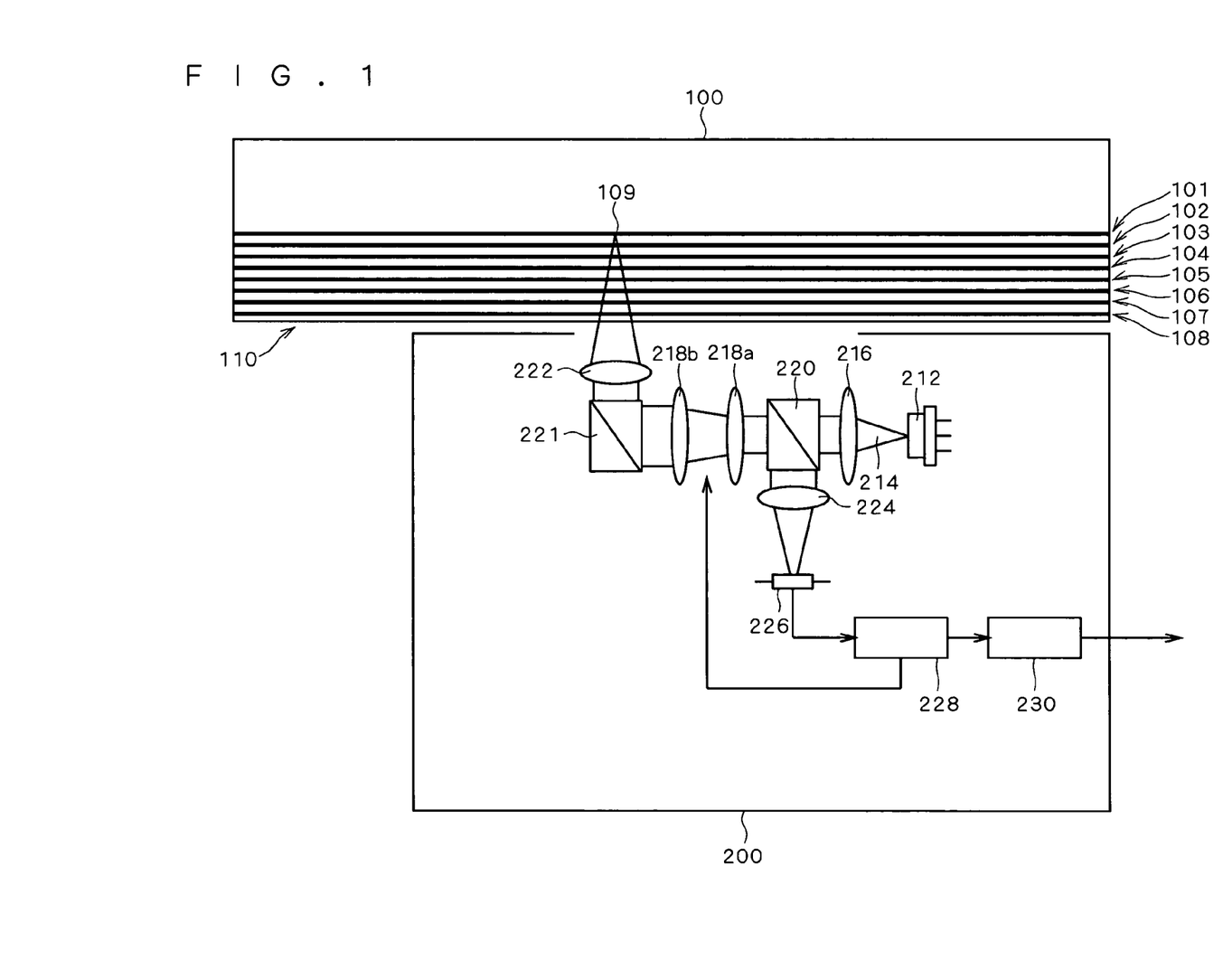
FIG. 1 is a schematic diagram of an optical disk and an optical disk device for recording or reproducing information on or from the optical disk according to a first preferred embodiment.

FIG. 1 is a schematic diagram of an optical disk 100 and an optical disk device 200 for recording or reproducing information on or from the optical disk 100 according to a first preferred embodiment.

As shown in FIG. 1, the optical disk 100 has a plurality of (eight in FIG. 1) information layers 101 to 108 (a group of information layers) laminated in its thickness direction. These information layers 101 to 108 are each capable of optically recording or reproducing information.

FIG. 1 is an illustration where access is made to the information layer 101 (deepest information layer) which is placed at the farthest position from a surface 110 of the optical disk 100 among the information layers 101 to 108.

In the optical disk device 200, luminous flux 214 emitted from a luminous source 212 is converted to parallel luminous flux by a collimator lens 216, then passes through a prism 220, and is then converted to appropriate luminous flux such as divergent luminous flux or convergent luminous flux by beam expanders 218*a* to 218*b*. The luminous flux 214 is then reflected by a prism 221, to converge to a converging spot 109 in the information layer 101 by an objective lens 222. Information is thus recorded or reproduced.

In this convergence, the luminous flux 214 that has passed through the objective lens 222 passes through the information layers 102 to 108 backward from the information layer 108, and then focuses on the converging spot 109 in the information layer 101. Then, the luminous flux 214 reflected in the information layer 101 passes through the information layers 102 to 108 in this order and then reenters the objective lens 222. The luminous flux 214 is subsequently reflected by the prism 221, and then passes through the beam expanders 218*a* to 218*b* and is reflected by the prism 220, to be irradiated onto a light detector 226 by a sensor lens 224.

The light detector 226 converts the luminous flux 214 that has been received through irradiation to a current (photoelectric conversion), and inputs the current to a signal processor 228. The signal processor 228 generates a signal based on the input current (namely, based on the amount of light emission of the luminous flux 214). The generated signal is used to control the beam expanders 218a and 218b, and is also input to an image processor 230. The image processor 230 conducts image processing (recording or reproduction) based on the input signal. Recording or reproduction on or from the optical disk 100 can thus be made using the optical disk device 200.

When accessing the information layers 102 to 108 that are placed closer to the surface 110 than the information layer 101, the beam expanders 218a and 218b can be controlled appropriately by changing the control signal output from the signal processor 228. Thus the luminous flux 214 can be converted to appropriate luminous flux such as divergent luminous flux or convergent luminous flux by changing the positions of the beam expanders 218a and 218b and making fine adjustments to the distance between them. That is, fine adjustments are made to the distance between the beam expanders 218a and 218b, thereby making fine adjustments to spherical aberration of the converging spot 109, and optimizing wave aberration that includes the spherical aberration. This allows the luminous flux 214 to converge not only in the information layer 101 but also in the information layers 102 to 108, which allows recording or reproduction of information on or from those layers as well.

Figure 2:
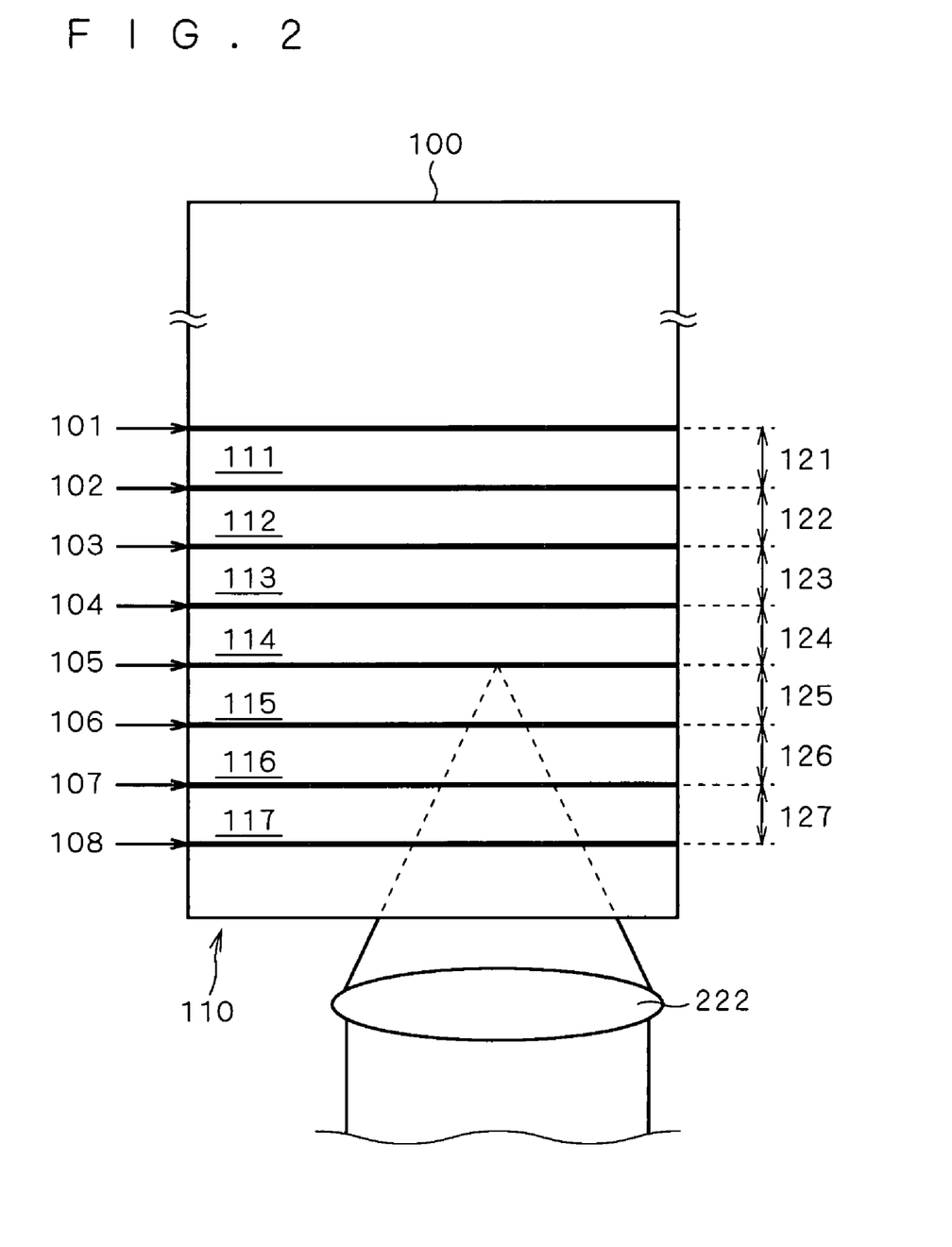
FIG. 2 is a cross-sectional diagram of a detailed structure of information layers in the optical disk according to the first preferred embodiment.

FIG. 2 is a cross-sectional diagram of a detailed structure of the information layers 101 to 108 in the optical disk 100 shown in FIG. 1.

In FIG. 2, the information layers 101 to 108 are separated by light transmitting layers 111 to 117, respectively. The light transmitting layers 111 to 117 have thicknesses 121 to 127, respectively, as shown in FIG. 2.

In addition, the information layer 101 is placed at a depth of approximately 100 μm from the surface 110 of the optical disk 100.

The thicknesses 121 to 127 are so set that recording or reproducing capability with respect to the information layers 101 to 108 are optimized. By way of example, the thicknesses 121 to 127 are set to 15 μm, 10 μm, 15 μm, 8 μm, 5 μm, 8 μm, and 5 μm, respectively. As mentioned above, the information layer 101 is placed at a depth of 100 μm from the surface 110 of the optical disk 100. Namely, the information layer 108 is placed at a depth of 100−(15+10+15+8+5+8+5)=100−66=34 μm from the surface 110 of the optical disk 100 (for convenience of the drawing, the light transmitting layers 111 to 117 and the like are schematically illustrated as having almost the same thickness).

Figure 3:
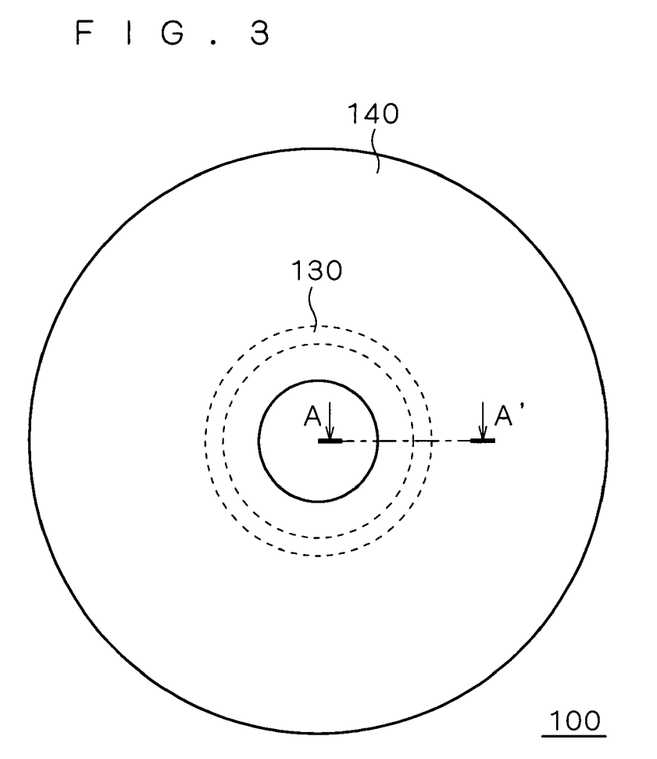
FIG. 3 is a top view of a management information area including management information on the information layers in the optical disk according to the first preferred embodiment.

FIG. 3 is a top view of a management information area 130 including management information on the information layers 101 to 108 in the optical disk 100 shown in FIG. 1. As shown in FIG. 3, in the optical disk 100, the management information area 130 is placed inside a user data area 140 on which user data including image data and the like is recorded, namely, at the innermost circumference position of the optical disk 100, in the information layer 101. The management information including characteristics and locations on the information layers 101 to 108 can be obtained by reproducing the management information area 130.

In existing standards, an optical disk includes a maximum of eight information layers and has a management information area placed at a depth of approximately 100 μm from the surface. Accordingly, the above-described structure allows the optical disk 100 to conform to the established standards in which a management information area is placed at a depth of approximately 100 μm from the surface.

Figure 4:
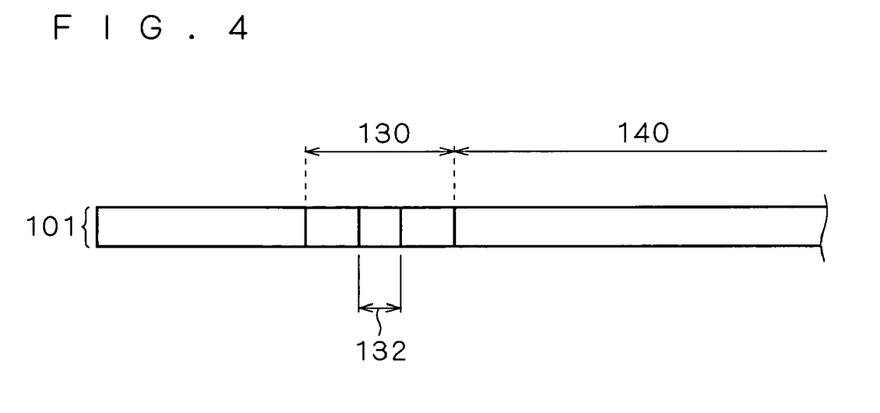
FIG. 4 is a cross-sectional diagram of the management information area according to the first preferred embodiment.

FIG. 4 is a cross-sectional diagram of the management information area 130 shown in FIG. 3 taken along line A-A' in FIG. 3. As shown in FIG. 4, a position information area 132 indicating the positions of the information layers 101 to 108 is placed in the management information area 130.

Figure 5:
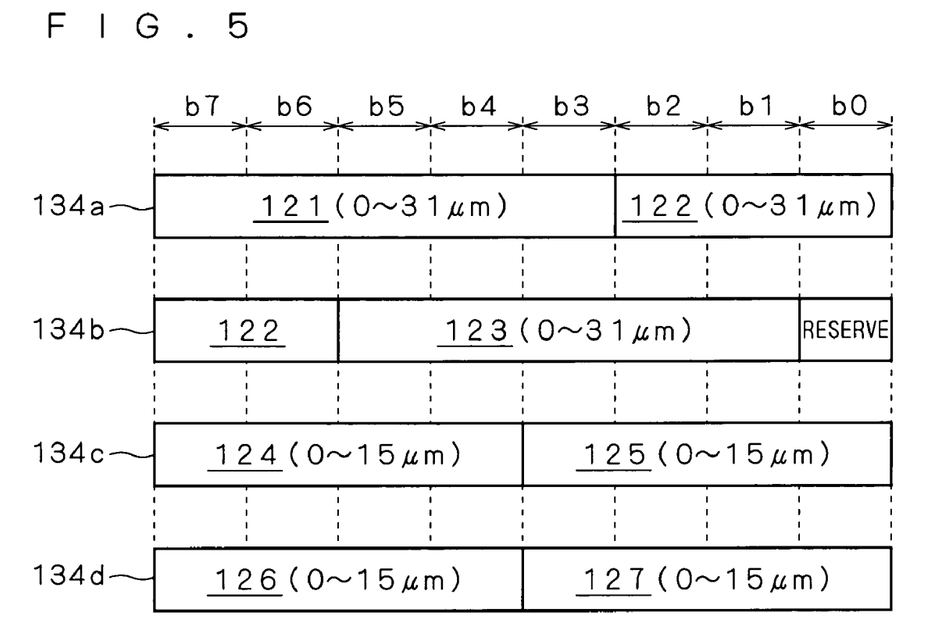
FIG. 5 is a schematic diagram of the placement of information fields in the position information area according to the first preferred embodiment.

FIG. 5 is a schematic diagram of the placement of information fields 134a to 134d in the position information area 132 shown in FIG. 4. As shown in FIG. 5, the information fields 134a to 134d each have an information amount of 1 byte, namely, 8 bits, and stores the thicknesses 121 to 127 with 1-μm resolution. Namely in FIG. 5, the positions of the information layers 101 to 108 are stored as the thicknesses 121 to 127 of the light transmitting layers 111 to 117, respectively.

In FIG. 5, the thickness 121 is stored in 5 bits from the third bit to the seventh bit of the information field 134a. Namely, the thickness 121 is stored in a range of 0 to 31 μm.

Also, the thickness 122 is stored in the total of 5 bits consisting of 3 bits from the zeroth bit to the second bit of the information field 134a and 2 bits from the sixth bit to the seventh bit of the information field 134b. Namely, the thickness 122 is stored in a range of 0 to 31 μm.

Also, the thickness 123 is stored in 5 bits from the first bit to the fifth bit of the information field 134b. Namely, the thickness 123 is stored in a range of 0 to 31 μm.

Also, the thickness 124 is stored in 4 bits from the fourth bit to the seventh bit of the information field 134c. Namely, the thickness 124 is stored in a range of 0 to 15 μm:

Also, the thickness 125 is stored in 4 bits from the zeroth bit to the third bit of the information field 134c. Namely, the thickness 125 is stored in a range of 0 to 15 μm.

Also, the thickness 126 is stored in 4 bits from the fourth bit to the seventh bit of the information field 134d. Namely, the thickness 126 is stored in a range of 0 to 15 μm.

Also, the thickness 127 is stored in 4 bits from the zeroth bit to the third bit of the information field 134d. Namely, the thickness 127 is stored in a range of 0 to 15 μm.

Information is not particularly stored in the zeroth bit of the information field 134b, which is kept in reserve.

The eight information layers 101 to 108 are used in this embodiment. Alternatively, when there are seven or less (e.g. four) information layers, the thicknesses 124 to 127 may be stored as 0 since the information layers 105 to 108 and the light transmitting films 114 to 117 are not provided. As the number of information layers becomes smaller from eight, one information layer can have a greater thickness. In FIG. 5, the thicknesses 121 to 123 can be set to greater values than the thicknesses 124 to 127. When there are as few as four information layers, for example, the thicknesses 121 to 123 are set to greater values than those indicated in the paragraph 0021, respectively, thus making effective use of the 100-μm range mentioned above. Meanwhile, when there are as many as eight information layers, for example, the thicknesses 124 to 127 which are needed to be set will not be set to very great values because the thicknesses 121 to 123 have been set to prescribed values. That is, the position information area 132 can be used efficiently by rendering the thicknesses 121 to 123 settable in a relatively wide range and the thicknesses 124 to 127 settable in a relatively narrow range.

Figure 6:
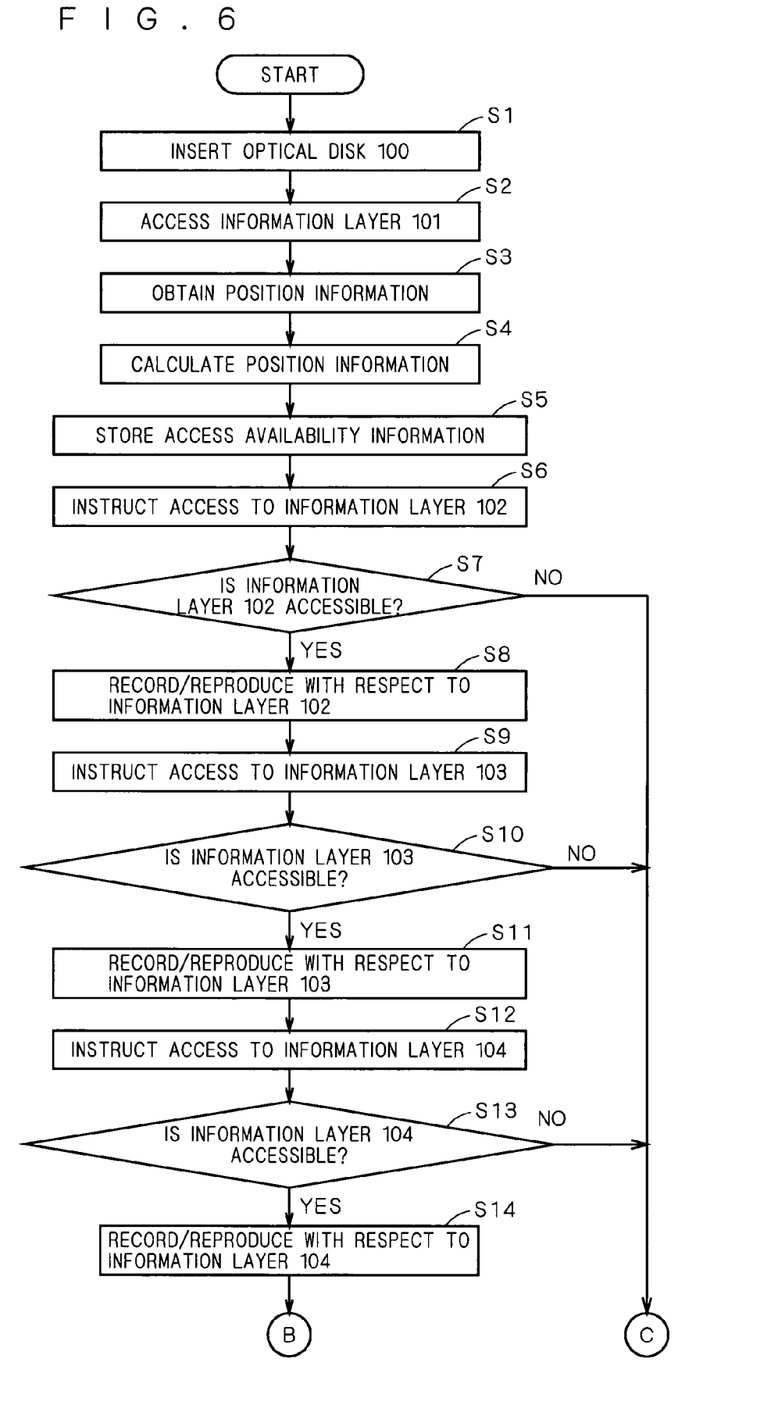
FIG. 6 is a flowchart of an access operation to the optical disk by the optical disk device according to the first preferred embodiment.
Figure 7:
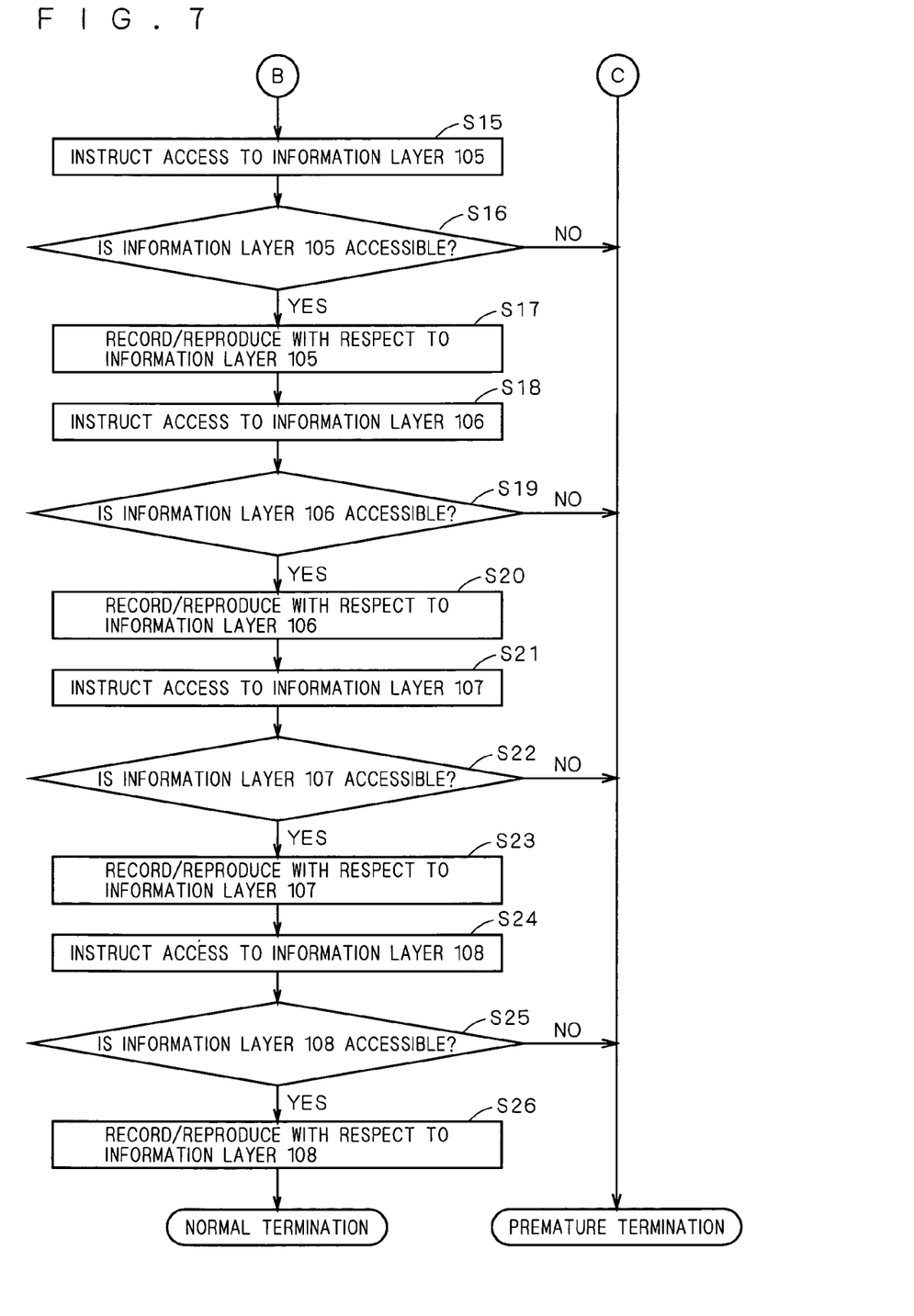
FIG. 7 is a flowchart of an access operation to the optical disk by the optical disk device according to the first preferred embodiment.

FIGS. 6 to 7 are flowcharts of an access operation to the optical disk 100 by the optical disk device 200 shown in FIG. 1. In the following example, the optical disk device 200 is designed to be capable of accessing a depth from 60 to 100 μm from the surface 110 in the optical disk 100, but incapable of accessing a depth from 0 to 60 μm.

First in step S1, the optical disk 100 is inserted into the optical disk device 200.

Then in step S2, the optical disk device accesses the optical disk 100, to start reproducing the information layer 101. This operation starts automatically in response to the insertion operation of the optical disk 100 in step S1.

Next in step S3, the information fields 134a to 134d of the position information area 132 are read in the management information area 130. Position information is thus obtained.

Next in step S4, calculation processing such as addition is performed using the position information obtained in step S3, to obtain depth information on each of the information layers 101 to 108 from the surface 110. For example, the depth information on the information layer 105 can be obtained by adding the thicknesses 111 through 113 and subtracting 100 μm from the sum.

Next in step S5, access availability information indicating whether each of the information layers 101 to 108 can be accessed is generated based on the depth information obtained in step S4, and stored in a storage section (not shown) included in the optical disk device 200. In the following example, the information layers 101 to 104 have depth information of 60 to 100 μm (accessible), and the information layers 105 to 108 have depth information of 0 to 60 μm (inaccessible).

Next in step S6, access to the information layer 102 is instructed.

Next in step S7, it is determined whether the information layer 102 can be accessed using the access availability information stored in step S5. Processing then goes to step S8 when accessible, or is prematurely terminated when inaccessible (because the information layers 101 to 104 are accessible as mentioned above, processing goes to step S8 in this case).

Next in step S8, information is recorded on or reproduced from the information layer 102. In this process, as described above, the luminous flux 214 can be converted to appropriate luminous flux such as divergent luminous flux or convergent luminous flux by changing the positions of the beam expanders 218a and 218b and making fine adjustments to the distance between them. That is, fine adjustments are made to the distance between the beam expanders 218a and 218b, thereby making fine adjustments to spherical aberration of the converging spot 110, and optimizing wave aberration that includes the spherical aberration.

Subsequently, a similar operation to steps S6 to S8 is executed in steps S9 to S1 and in steps S12 to S14, respectively, to record and reproduce information on and from the information layers 103 to 104. Since the information layers 105 to 108 are inaccessible as mentioned above, it is determined that the information layer 105 is inaccessible in step S16 in response to an instruction to access the information layer 105 in step S15, thus prematurely terminating the processing. Thus in this case, steps S17 to S26 shown in FIG. 7 are not executed and information is not recorded on and reproduced from the information layers 105 to 108.

In a similar way to steps S8 to S10, steps S17 to S19 are executed when the information layer 105 is accessible, steps S20 to S22 are executed when the information layer 106 is accessible, and steps S23 to S25 are executed when the information layer 107 is accessible. Step S26 is further executed when the information layer 108 is accessible, normally terminating the processing.

The structure and operation of the optical disk device according to this embodiment will now be described in further detail.

Figure 8:
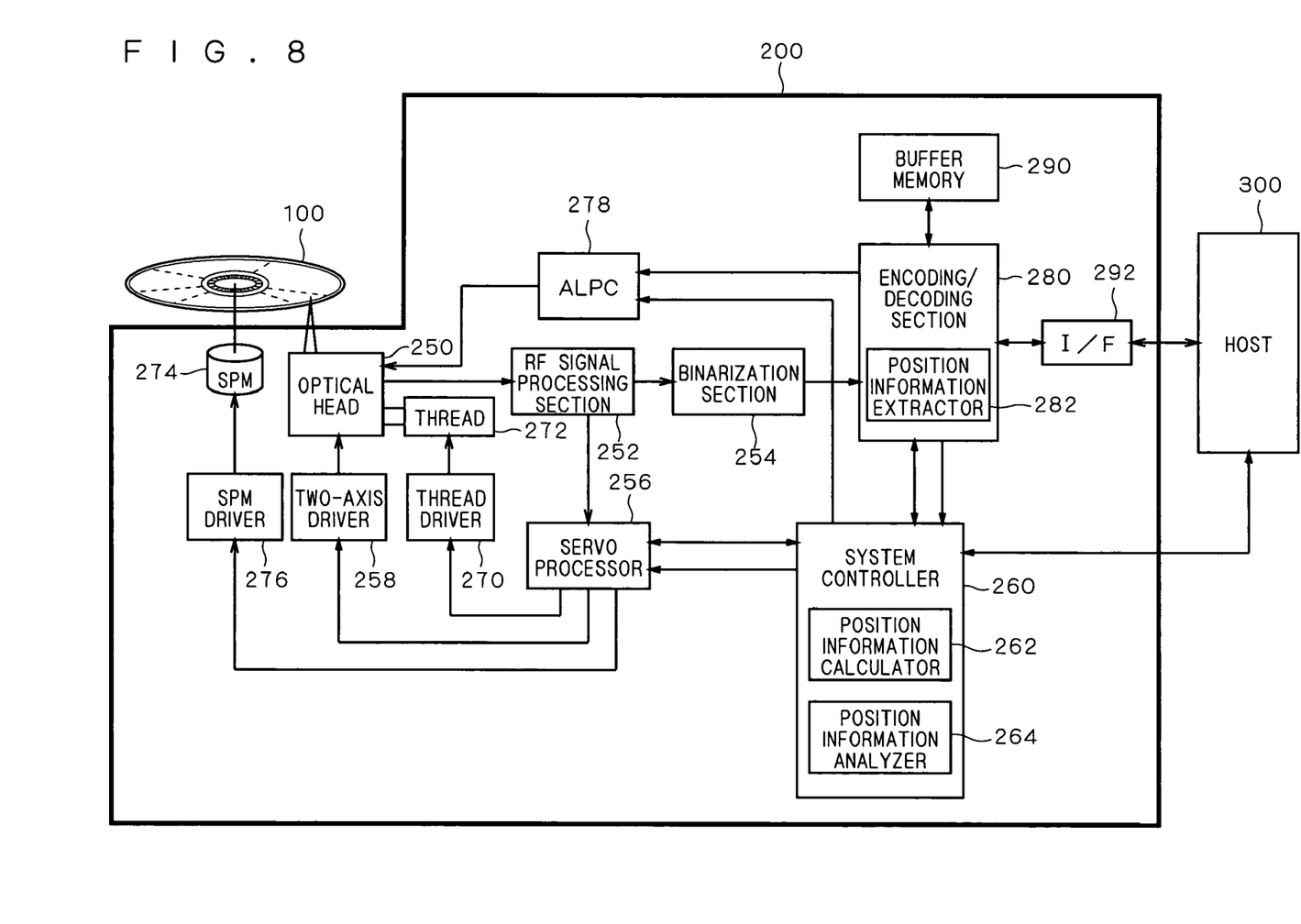
FIG. 8 is a block diagram of a detailed structure of the optical disk device according to the first preferred embodiment.

FIG. 8 is a block diagram of a detailed structure of the optical disk device 200.

In FIG. 8, an optical head 250 reads a signal from the optical disk 100. Although not shown in FIG. 8, the optical head 250 includes the luminous source 212, the objective lens 222, the light detector 226 and the like shown in FIG. 1. The signal read by the optical head 250 is amplified at an RF signal processing section 252, which then generates a reproduced RF signal, a tracking error signal, and a focus error signal.

The reproduced RF signal output from the RF signal processing section 252 is input to a binarization section 254.

The tracking error signal and the focus error signal output from the RF signal processing section 252 are input to a servo processor 256. The servo processor 256 generates a focus drive signal and a tracking drive signal based on the input tracking error signal and focus error signal, respectively, and inputs generated the signals to a two-axis driver 258. The two-axis driver 258 drives a focus coil and a tracking coil (not shown in FIG. 8) included in the optical head 250 in response to the input focus drive signal and tracking drive signal, respectively. The objective lens 222 is thus driven, to perform focus control and tracking control.

First, an operation of accessing (seeking) a desired address is described.

The servo processor 256 generates a thread control signal based on a thread error signal obtained from a low-frequency component of the tracking error signal input from the RF signal processing section 252, an access execution control signal from a system controller 260, and the like, and inputs the thread control signal to a thread driver 270. The thread driver 270 drives a thread 272 in response to the input thread control signal. The optical head 250 is thus slide-moved.

Next, an operation of reproducing information recorded on the optical disk 100 is described.

A spindle motor 274 is driven to rotate the optical disk 100 at prescribed speed (or prescribed angular speed) in response to a control signal from a spindle motor driver (SPM driver) 276. In this process, an automatic laser power control section (ALPC) 278 reads the optical disk 100 through the optical head 250 with prescribed reproducing laser power in response to a laser control signal from the system controller 260.

The reproduced RF signal that has been input to the binarization section 254 from the RF signal processing section 252 is digitized at the binarization section 254, which then generates a modulating signal. The modulating signal output from the binarization section 254 is input to an encoding/decoding section 280. The encoding/decoding section 280 includes a functional region as a decoder for reproduction, and a functional region as an encoder for recording. In the course of reproduction, the encoding/decoding section 280 subjects the input modulating signal to an error correction process, a deinterleave process and the like through a buffer memory 290, and then decodes the signal. A decode signal is thus generated. The decode signal generated at the encoding/decoding section 280 is input to a host 300 including a personal computer and the like via an interface (I/F) 292 employing the ATAPI standard and the like.

The system controller 260 exchanges commands and a variety of information with the servo processor 256, the encoding/decoding section 280, and the host 300. The host 300 functions as a control device according to the present invention. FIG. 8 illustrates the control device (host 300) as a personal computer and the like placed outside the optical disk device 200. Alternatively, the control device may be placed integrally with the optical disk device 200 (inside the optical disk device 200).

The initial operation of the optical disk 100 will now be described.

Upon insertion of the optical disk 100 and power-on, the optical disk device 200 starts accessing the optical disk 100 outward from the innermost circumference. After accessing a prescribed address corresponding to the management information area 130 shown in FIG. 3, the encoding/decoding section 280 starts buffering the data with respect to the buffer memory 290. Namely, the aforementioned error correction process, deinterleave process and the like are started.

The encoding/decoding section 280 extracts the position information in the position information area 132 out of information in the management information area 130 that has been normally reproduced in the error correction process, by using a position information extractor 282, and inputs the extracted information to the system controller 260. The system controller 260 obtains depth information on each of the information layers 101 to 108 based on the input position information by using a position information calculator 262. Then, the system controller 260 conducts analysis and determines whether each of the information layers 101 to 108 is accessible by the optical disk device 200 based on the obtained depth information by using a position information analyzer 264.

Figure 9:
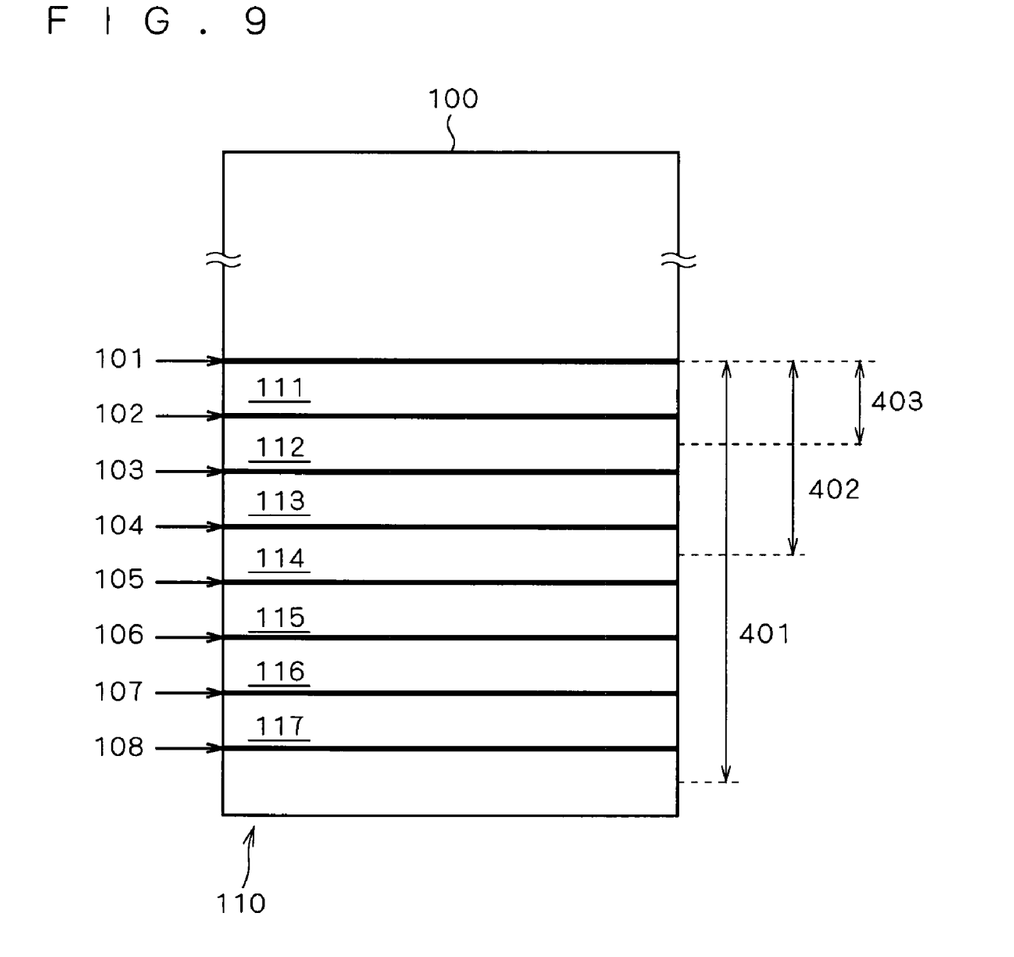
FIG. 9 is a cross-sectional diagram schematically illustrating access availability of areas between the surface and the deepest information layer in the optical disk according to the first preferred embodiment.

FIG. 9 is a cross-sectional diagram schematically illustrating access availability of areas between the surface 110 and the deepest information layer 101 in the optical disk 100.

Ranges 401 to 403 indicate ranges of accessible depth by the optical disk device 200 (e.g. 60 to 100 μm).

When the range 401 is set as an accessible range, the optical disk device 200 can access all of the information layers 101 to 108. Accordingly, it is determined by the position information analyzer 264 that all of the information layers 101 to 108 are accessible.

When the range 402 is set as an accessible range by the optical disk device 200, it is determined by the position information analyzer 264 that the information layers 101 to 104 are accessible but the information layers 105 to 108 are inaccessible.

When the range 403 is set as an accessible range by the optical disk device 200, it is determined by the position information analyzer 264 that the information layers 101 to 102 are accessible but the information layers 103 to 108 are inaccessible.

Upon issuance of a recording command or reproducing command from the host 300, a recording operation or reproducing operation is performed on information layers determined as being accessible by the position information analyzer 264.

A recording operation or reproducing operation is not performed on information layers determined as being inaccessible by the position information analyzer 264 upon issuance of a recording command or reproducing command from the host 300. The host 300 is informed that the information layers are inaccessible.

Figure 10:
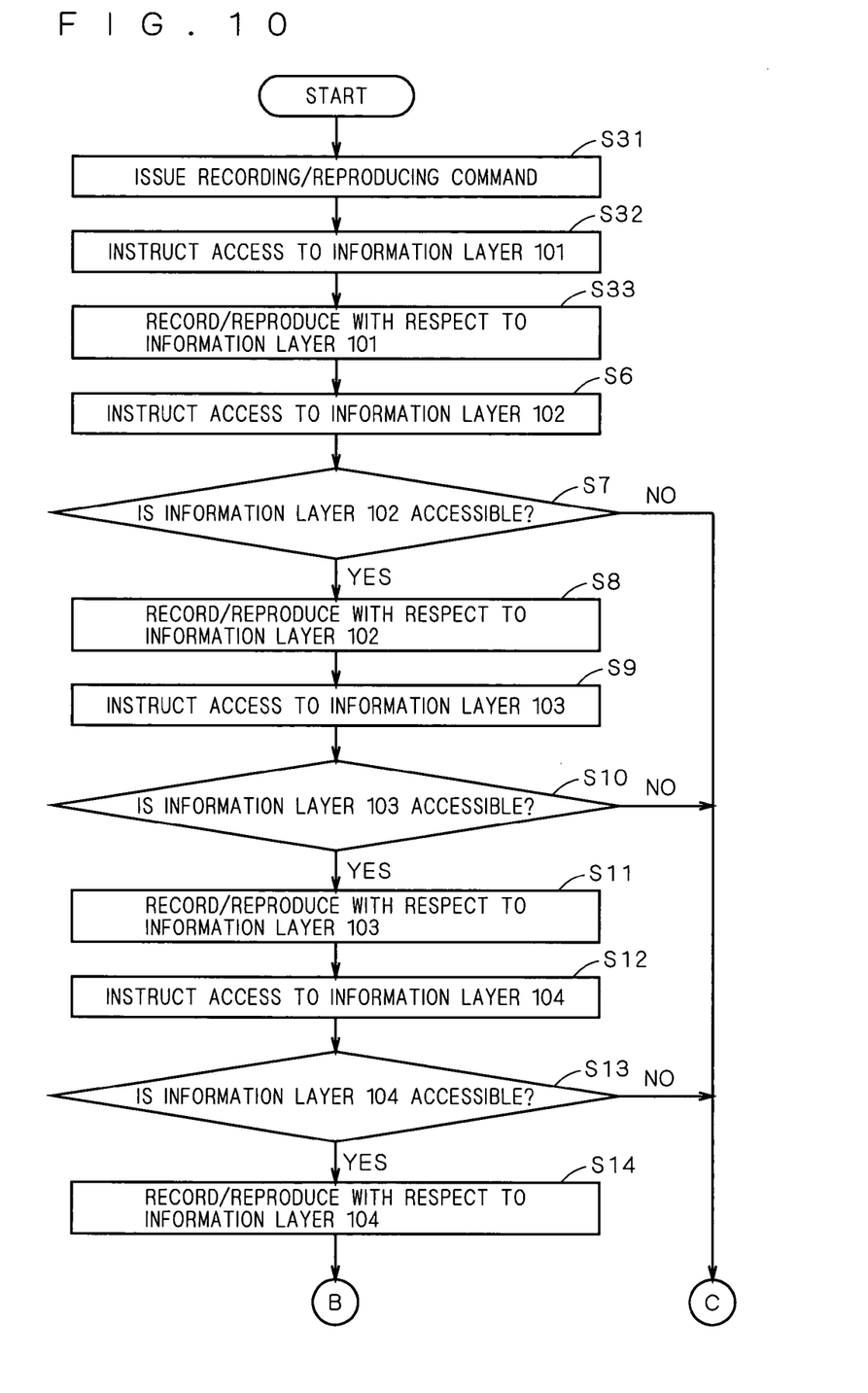
FIG. 10 is a flowchart of a storage/reproducing operation of the optical disk device according to the first preferred embodiment.

FIG. 10 is a flowchart of a recording/reproducing operation of the optical disk device 200 based on a command from the host 300. In FIG. 10, steps S31 to S33 are executed instead of steps S1 to S5 in the flowchart shown in FIG. 6. That is, FIG. 10 is under the assumption that the optical disk 100 has been inserted into the optical disk device 200, and thus the access availability information has been generated (stored).

First in step S31, a storage/reproducing command issued by the host 300 is transmitted to the optical disk device 200.

Next in step S32, access to the information layer 101 is instructed.

Next in step S33, information is recorded on or reproduced from the information layer 101.

Next in step S6, the operations in steps S6 to S14 shown in FIG. 6 and steps S15 to S26 shown in FIG. 7 are executed.

As described above, the optical disk 100 according to this embodiment has the position information area 132 indicating the respective positions in a thickness direction of the information layers 101 to 108 placed in the information layer 101'. This reduces the time necessary for detecting the positions of the respective information layers when accessing the layers by the optical disk device 200, thereby reducing access time.

In addition, the prior detection of inaccessible information layers prevents a malfunction that occurs when access is tried to an inaccessible information layer.

Further, with the position information being placed in the information layer 101 placed at the farthest position from the surface 110, the position information can be obtained even when the optical disk device 200 is designed to be incapable of accessing the other information layers.

Moreover, with each position information (each of the thicknesses 121 to 127 in this embodiment) being represented in 4- or 5-bit lengths and the whole of the position information (the whole of the information fields 134a to 134d in this embodiment) being represented in 4-byte lengths, the position information area 132 can be used even more efficiently.

While the information layers 102 to 108 are accessed in this order in the flowcharts shown in FIGS. 6 and 10 as described above, the information layers 102 to 108 may be accessed in any sequence.

Second Preferred Embodiment

In the first preferred embodiment, the host 300 issues a recording command or reproducing command with respect to inaccessible information layers as well. This can reduce processing efficiency.

Figure 11:
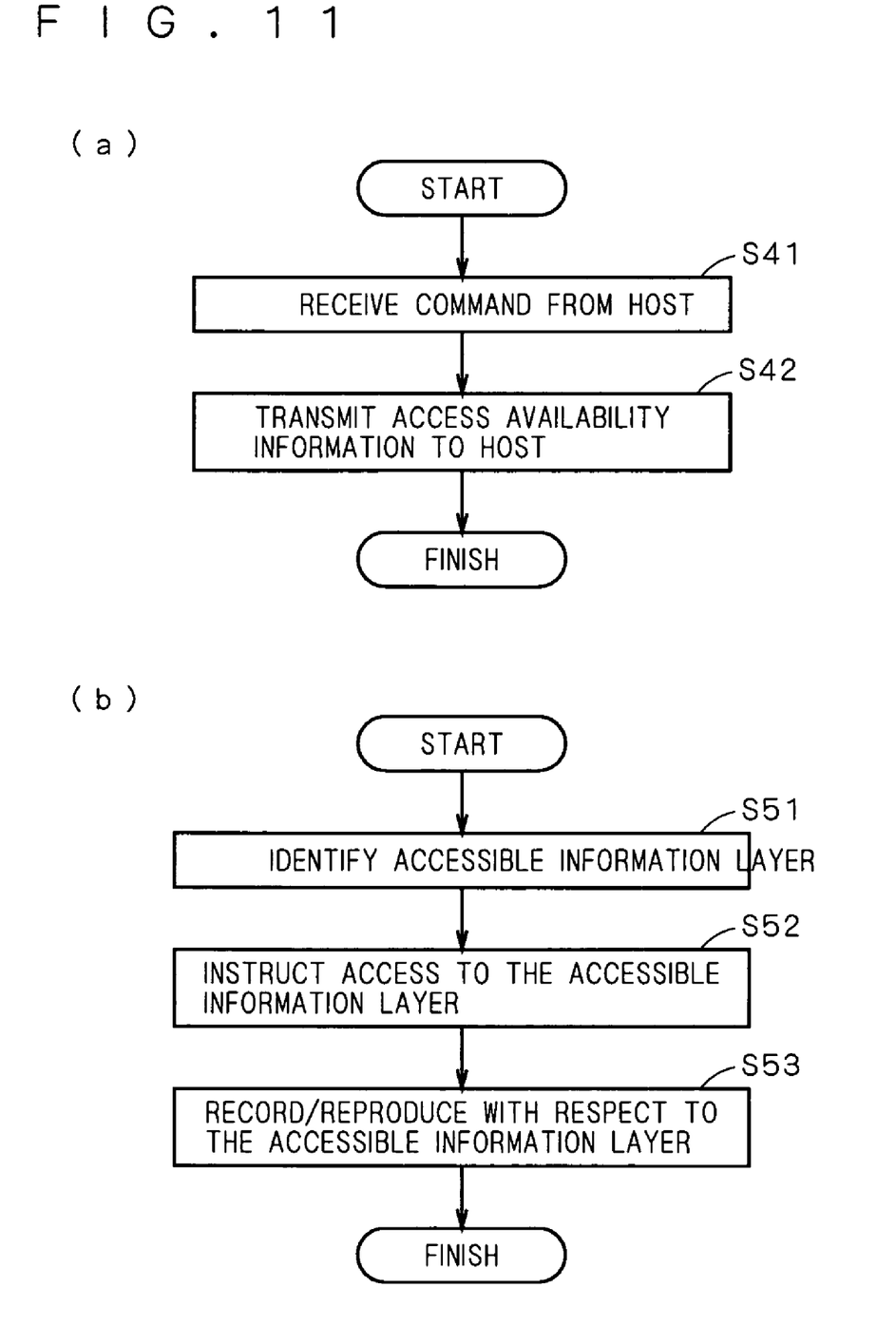
FIG. 11 are flowcharts of operations of a host and the optical disk device according to a second preferred embodiment.

FIG. 11 are flowcharts of operations of the host and the optical disk device according to this embodiment.

First, referring to FIG. 11(*a*), an operation of the host 300 of detecting access availability of each information layer is described.

First in step S41, the optical disk device 200 receives an access-status checking command from the host 300.

Then in step S42, the optical disk device 200 transmits previously stored access availability information to the host 300. This allows the host 300 to detect the access availability of each information layer.

Next, referring to FIG. 11(*b*), an operation of the host 300 of instructing recording/reproduction is described.

First in step S51, the host 300 identifies accessible information layers by referring to the access availability information received from the optical disk device 200 in step S42 shown in FIG. 11(*a*).

Then in step S52, the host 300 transmits instructions to access the accessible information layers identified in step S51 to the optical disk device 200.

Next in step S53, information is recorded on or reproduced from the accessible information layers by the optical disk device 200.

As described above, the host 300 according to this embodiment instructs access only to accessible information layers. This prevents unnecessary commands from being issued, thereby improving processing efficiency, in addition to the effects obtained from the first preferred embodiment.

Third Preferred Embodiment

In the first preferred embodiment, the positions of the information layers 101 to 108 are stored using the thicknesses 121 to 127 of the light transmitting layers 111 to 117, respectively. As mentioned above, however, the use of the thicknesses 121 to 127 requires calculation processing such as addition to obtain the depth information. In addition, the calculation processing may have large errors due to a summation of errors of decimal places.

Figure 12:
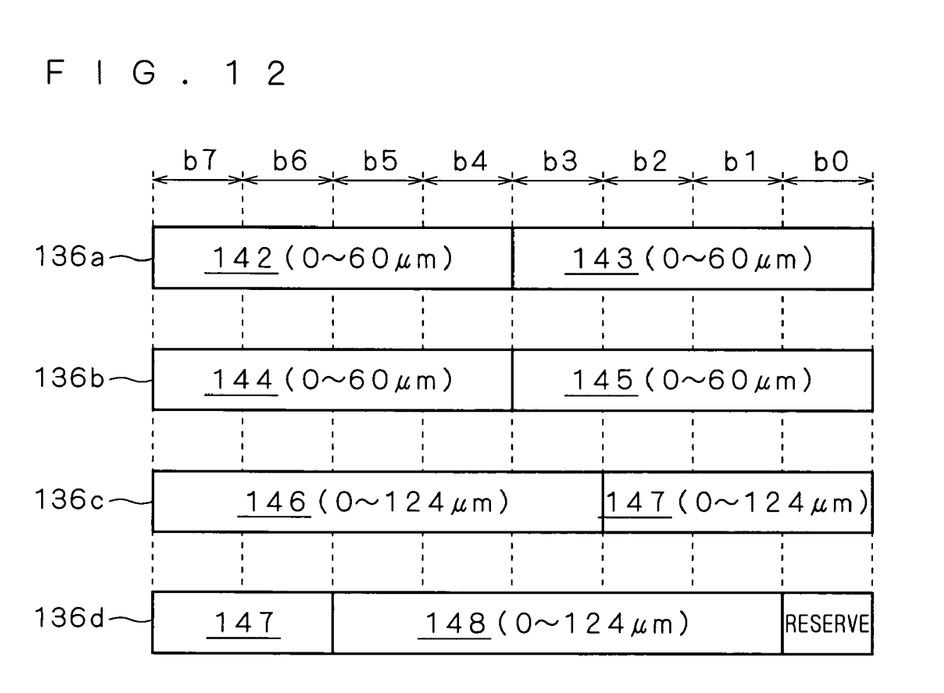
FIG. 12 is a schematic diagram of the placement of information fields according to a third preferred embodiment.

FIG. 12 is a schematic diagram of the placement of information fields 136a to 136d according to this embodiment. As shown in FIG. 12, the information fields 136a to 136d each have an information amount of 1 byte, namely, 8 bits, like the information fields 134a to 134d shown in FIG. 5. The information fields 136a to 136d store the positions of the information layers 102 to 108 as distances 142 to 148 that are relative distances between the information layers 102 to 108 and the information layer 101, respectively, instead of as the thicknesses 121 to 127. The distances 142 to 148 are stored with 4-μm resolution.

In FIG. 12, the distance 142 is stored in 4 bits from the fourth bit to the seventh bit of the information field 136a. Namely, the distance 142 is stored in a range of 0 to 60 μm.

Also, the distance 143 is stored in 4 bits from the zeroth bit to the third bit of the information field 136a. Namely, the distance 143 is stored in a range of 0 to 60 μm.

Also, the distance 144 is stored in 4 bits from the fourth bit to the seventh bit of the information field 136b. Namely, the distance 144 is stored in a range of 0 to 60 μm.

Also, the distance 145 is stored in 4 bits from the zeroth bit to the third bit of the information field 136b. Namely, the distance 145 is stored in a range of 0 to 60 μm.

Also, the distance 146 is stored in 5 bits from the third bit to the seventh bit of the information field 136c. Namely, the distance 146 is stored in a range of 0 to 124 μm.

Also, the distance 147 is stored in the total of 5 bits consisting of 3 bits from the zeroth bit to the second bit of the information field 136c and 2 bits from the sixth bit to the seventh bit of the information field 136d. Namely, the distance 147 is stored in a range of 0 to 124 μm.

Also, the distance 148 is stored in 5 bits from the first bit to the fifth bit of the information field 136d. Namely, the distance 148 is stored in a range of 0 to 124 μm.

Information is not particularly stored in the zeroth bit of the information field 136d, which is kept in reserve.

The distance from the information layer 101 increases in the information layers 102 to 108 in this order, so the distances 146 to 148 can be set to greater values than the distances 142 to 145. By way of example, when the distances 142 to 148 are 10 μm, 20 μm, 30 μm, 50 μm, 70 μm, 80 μm, and 90 μm, respectively, the distances 142 to 145 are not more than 60 μm while the distances 146 to 148 are greater than 60 μm. That is, the position information area 132 can be used efficiently by rendering the distances 146 to 148 settable in a relatively wide range and the distances 142 to 145 settable in a relatively narrow range.

As described above, the optical disk according to this embodiment uses, as position information of each information layer, a relative distance between the deepest information layer and each information layer instead of the thickness of each light transmitting layer. This renders the calculation processing such as addition to obtain the depth information unnecessary, thereby reducing errors involved in the calculation process, in addition to the effects obtained from the first preferred embodiment.

While the invention has been shown and described in detail, the foregoing description is in all aspects illustrative and not restrictive. It is therefore understood that numerous modifications and variations can be devised without departing from the scope of the invention.

The invention claimed is:

1. An optical disk comprising
a plurality of information layers, each configured for optically recording information thereon or optically reproducing information therefrom, wherein
position information indicating positions of said respective information layers in a thickness direction of said optical disk is recorded in said plurality of information layers, wherein:
said position information indicates said positions as distances between respective pairs of said information layers adjacent to one another, and
said position information represents the distance between the pair of adjacent information layers including the deepest information layer, which is farthest from a surface into which recording light or reproducing light of said optical disk enters, with a longer bit length than the distance between the pair of adjacent information layers including the information layer farthest from said deepest information layer.

2. The optical disk according to claim 1, wherein said position information indicates distances between said deepest information layer and said respective information layers.

3. The optical disk according to claim 1, wherein each of said position information is represented in 4- or 5-bit lengths.

4. The optical disk according to claim 3, wherein the whole of said position information is represented in 4-byte lengths.

5. An optical disk device for recording or reproducing information on or from the optical disk according to claim 1,
said optical disk device comprising a position information extractor for extracting said position information from said optical disk,
said optical disk device generating access availability information indicating access availability of each of said information layers based on said extracted position information.

6. A control device for controlling the optical disk device according to claim 5, said control device instructing access only to accessible information layers based on said generated access availability information.

* * * * *